3,284,326
ELECTROLYTIC ETCHING OF ANODISABLE METAL FOIL

Henry Anthony Martin, London, England, assignor to Sprague Electric Company, North Adams, Mass, a corporation of Massachusetts
No Drawing. Filed Apr. 8, 1963, Ser. No. 271,504
Claims priority, application Great Britain, Apr. 9, 1962, 13,568/62
5 Claims. (Cl. 204—141)

This invention relates to processes of etching foils of aluminium for use in the manufacture of electrolytic capacitors. Etched foil has a much larger effective area per unit nominal area than has smooth surfaced foil and, when "formed" electrolytically to provide on its surface a thin insulating film of oxide and used as an anode in an electrolytic capacitor, imparts to such capacitor a much higher capacitance than has a capacitor having a "formed" anode of the same nominal dimensions but made of a film whose surfaces are neither etched nor otherwise roughened.

The increase in capacitance obtained by etching the foil may be expressed as the ratio of the capacitance at a given forming voltage of a filmed electrode having an etched surface to the capacitance at the same forming voltage of a similarly filmed smooth surfaced electrode of the same nominal size and shape. This ratio we term the "capacitance magnification." The capacitance magnification obtainable with a given film depends upon a number of parameters but principally upon the density and type of the etching current and upon the composition and concentration of the electrolyte.

Many are the compositions of electrolyte that have been proposed for use in the electrolytic etching of aluminium foils but one of the cheapest and most generally satisfactory electrolytes for this purpose is an aqueous solution of a chloride, usually sodium chloride, with or without a comparatively small addition of hydrochloric acid. Such an electrolyte will hereinafter, for the sake of brevity, be termed a chloride bath.

For foils for use in the manufacture of electrolytic capacitors it is common practice to use commercially smooth direct current as the etching current and a chloride bath as the electrolyte.

We have now discovered that etched foil having a higher magnification at a given forming voltage can be obtained by electrolytically etching foil by using direct current as the etching current, and, as the electrolyte, a chloride bath to which has been added a water-soluble suphate, the cations of the dissociated chloride and those of the dissociated sulphate being innocuous with regard to the foil insofar as concerns its subsequent use as a capacitor electrode. Examples of satisfactory chlorides and sulphates are the alkali metal chlorides and sulphates. Of these we prefer to use sodium chloride and sodium sulphate because they are cheap and readily available in a pure state.

The term "direct current" as used herein includes direct current as derived from a battery and as derived by rectification of alternating current, in other words "commercially smooth" direct current. We prefer to use a supply such that the current does not exhibit regularly repeated fluctuations of more than 25% of its average value.

Accordingly our invention comprises a process of treating aluminium foil to increase its capacitance magnification which comprises subjecting it to a direct current electrolytic etching process in an electrolyte consisting of a chloride bath containing in addition to the chloride ions sulphate ions and only such cations as are innocuous with regard to the foil insofar as concerns its use as a capacitor electrode.

As indicated above, the cations are preferably substantially wholly sodium but it is possible to use an acidified chloride bath in which a small proportion of the cations are hydrogen. The composition of the latter type of bath will change during use, as the aluminium removed from the foil dissolves in the bath and reduces the hydrogen ion concentration.

Our invention also comprises the manufacture of electrolytic capacitors from such etched foil and also includes capacitors so manufactured.

We prefer that the chloride ion content should not fall below the equivalent of a 1% solution of sodium chloride and that the sulphate ion content should not fall below the equivalent of a 0.1% solution of sodium sulphate but the optimum results are in general obtained when the chloride and sulphate ion contents are each much higher. Preferably the total anion content does not fall below the equivalent of that derived from a solution containing a minimum aggregate content of sodium chloride and sulphate of 10 parts per 100.

When an acidified bath is used we prefer that the mole percentage of hydrogen ions should not exceed 10% of the total cationic content.

The optimum composition of the electrolyte depends upon the etching conditions. For example, a composition that gives optimum results with batch methods of etching does not necessarily yield equivalent results when used with continuous methods of etching, and vice versa. The choice of composition may also be governed to some extent by the purpose for which the etched foil is required, e.g. upon the voltage at which the etched foil is to be anodically formed. Optimum compositions for any particular case can readily be determined experimentally and magnification factors of 20 and above can readily be obtained.

A number of etching baths and of processes in accordance with the invention of treating aluminium foil to increase its capacitance magnification using said baths will now be described by way of example. The composition of the various baths is set out in Table I below, the table giving the percentages of various chlorides and sulphates and other ingredients made up in aqueous solutions to form the bath.

TABLE I

| Composition | Percentage by weight of Chloride | Percentage by weight of Sulphate | Percentage by weight of other ingredients |
|---|---|---|---|
| A | Sodium, 2 | Sodium, 1 | |
| B | Sodium, 25 | Sodium, 5 | |
| C | Sodium, 15 | Sodium, 15 | |
| D | Sodium, 28 | Sodium, 2 | |
| E | Sodium, 25 | Sodium, 0.1 | |
| F | Sodium, 25 | Sodium, 1 | |
| G | Sodium, 25 | Sodium, 2 | |
| H | Sodium, 25 | Sodium, 8 | |
| I | Potassium, 19.2 | Potassium, 6.14 | |
| J | Magnesium ($MgCl_2 6H_2O$), 31. | Magnesium ($MgSO_4 7H_2O$), 10.4. | |
| K | Ammonium, 22.9 | Ammonium, 4.65 | |
| L | Sodium, 20 / Aluminium, 3.8 | Sodium, 5 | |
| M | Aluminium, 19 | Aluminium, 4 | |
| N | Sodium, 20 | Sodium, 5 | Hydrochloric acid, 3.1. |
| O | Sodium, 25 | | Sulphuric acid, 2. |
| P | Sodium, 15 | Sodium, 5 | |

In Table I compositions I and J have a chloride and sulphate ion content equivalent to composition P and compositions K, L and M each have a content of chloride and sulphate ion equivalent to composition B.

Baths of compositions set out in Table I were used to etch aluminium foil by two processes, a continuous and a static process. In the continuous process an aluminium foil is passed continuously through pre-treatment baths and then over contact rollers into an etching bath where it passes between a pair of cathodes, it then passes through a washing treatment and is finally dried and wound on to a take-up reel. During the pre-treatment process the foil is both cleaned, for example by passing through dilute hydrochloric acid, and washed, the final washing preferably being in distilled water.

In the static process short lengths of foil that have been pre-treated as in the continuous process are clamped mid-way between a pair of cathodes and the whole lowered into a bath of the electrolyte, the current being switched on before the assembly of foil and cathodes are lowered into the electrolyte. After etching the lengths of foil are washed and oven dried. Before each specimen of aluminium foil is etched in the static process, if the electrolyte is one that had not previously been used pieces of foil not intended for use are immersed in the bath to produce an aluminium oxide precipitate.

To measure the magnification factor the specimens etched in the static process and specimens cut from spaced points along the length of foil etched in the continuous process were formed in 1% aqueous diammonium hydrogen phosphate at 90° C. using etched aluminium foil with a magnification factor of 5 as cathodes. The current supply was from batteries, a series resistance being reduced as the specimens formed, the maximum curent being 50 ma. per sq. cm. of foil. When the current had fallen to 0.4 ma. per sq. cm., measurement of capacitance and power factor was made in the same bath at half the forming voltage using a British Physical Laboratories Electrolytic Capacitor Bridge, model CB 154–D. For some specimens formation and measurement were carried out on the same specimen successively at 12.5, 25 and 50 v.

The magnification factors obtained in various processes using the continuous method are set out in Table II and using the static method are set out in Table III below.

Magnifications were calculated from the capacitance from the following nominal values for plain foil at each forming voltage when measured in aqueous electrolyte at 90° C.

Forming voltage: Capacitance of plain foil in microfarads per sq. cm.
12.5 _____ 0.79
25 _____ 0.42
50 _____ 0.23

TABLE II

| Ex. | Bath composition | Duration of etch in seconds | Current density in amps. per sq. cm. of foil | Formation voltage | Magnification factor |
|---|---|---|---|---|---|
| 1 | A | 68 | 1.15 | 12.5 | 22.8 |
| 2 | B | 68 | 1.07 | 12.5 | 41 |
| 3 | B | 68 | 1.07 | 25 | 30 |
| 4 | B | 68 | 1.07 | 50 | 23.5 |
| 5 | C | 68 | 1.0 | 12.5 | 34 |
| 6 | C | 48 | 1.49 | 12.5 | 38 |
| 7 | D | 68 | 1.07 | 12.5 | 39.5 |
| 8 | E | 68 | 1.03 | 25 | 21.5 |
| 9 | F | 68 | 1.03 | 25 | 27.5 |
| 10 | G | 68 | 1.03 | 25 | 28.5 |
| 11 | H | 68 | 1.03 | 25 | 34 |
| 12 | M | 50 | 1.03 | 25 | 22 |
| 13 | N | 50 | 1.03 | 25 | [1] 19 |
| 14 | O | 68 | 1.03 | 25 | [2] 21.5 |
| 15 | K | 50 | 1.03 | 25 | 25.5 |
| 16 | L | 50 | 1.03 | 25 | 26.5 |

[1] During the continuous process of Example 13 the magnification factor increased from 19.0 to 22.5, the length of foil passed through the bath being 350 cms. Aluminium equivalent to 40% of the acid content had dissolved during this time.
[2] Increased to 30.5 during the process which was carried on until all of the acid had been replaced by aluminium, in other words aluminium equivalent to the acid content had dissolved.

In all of the continuous processes the current was supplied from a three phase bridge rectifier giving a current output fluctuating by 13% from its average value.

In the static process the current was supplied from a battery.

TABLE III

| Ex. | Bath composition | Time in bath in seconds | Current density in amps. per sq. cm. | Formation voltage | Magnification factor |
|---|---|---|---|---|---|
| 17 | I | 75 | 1.2 | 25 | 28.5 |
| 18 | J | 75 | 1.2 | 25 | 31 |
| 19 | P | 75 | 1.2 | 25 | 33.5 |

All of the processes were carried out with the electrolyte at or near its boiling point and we prefer in all processes in accordance with the invention that the temperature of the etching bath should not fall more than 5° below its boiling point.

As already stated we prefer to use a bath containing sodium chloride and sodium sulphate. Our preferred bath composition is composition B of Table I. It will be seen from Table II that using a bath of this composition a magnification factor of 41 was obtained.

Using a bath of this preferred composition, tests were made to find the effect on the magnification factor of a foil formed at 25 v. of altering the amplitude of a 50 cycle per sec. fluctuation imposed on the D.C. etching current.

The results are set out in Table IV below.

TABLE IV

| Percentage fluctuation | Magnification factor |
|---|---|
| 4½ | 28 |
| 22 | 25 |
| 33 | 16.2 |
| 44 | 12.5 |
| 55 | 11.9 |

It is to be understood that the percentage fluctuation referred to in this specification is the total swing of the current in any one complete cycle from its maximum to its minimum value.

From Examples 8–11 it will be seen that when the sodium chloride content of the bath is kept constant the magnification factor rises from 21.5 to 34 as the sodium sulphate content rises from 0.1 to 8. From Examples 12, 17 and 18 and 15 and 16 it will be seen that there is no great change in the magnification factor when the nature of the cations is changed except that a considerable change takes place when the cation is wholly aluminium. From Examples 13 and 14 it will be seen that it is preferable not to use a bath which initially contains free acid. Examples 5 and 6 show the effect of decreasing the time of contact with the electrolyte and increasing the current density.

What I claim as my invention is:

1. A process of treating aluminium foil to increase its capacitance magnification which comprises subjecting it to a direct current electrolytic etching process in an electrolyte consisting of a chloride bath consisting essentially of chloride ions, sulphate ions and cations innocuous to the foil use in a capacitor, the cations including not more than 10 mole percent of hydrogen ions, the chloride ion content being at least the equivalent of a 1% solution of sodium chloride, the sulphate ion content being at least the equivalent of a 0.1% solution of sodium sulphate and the total anion content being at least the equivalent of a solution containing a minimum aggregate content of sodium chloride and sulphate of 10 parts per 100.

2. A process as claimed in claim 1 in which the bath temperature is maintained within 5° C. of its boiling point.

3. A process as claimed in claim 1 in which substantially all of the cations are members of the group consisting of alkali metals and ammonium ions.

4. A process as claimed in claim 1 in which the sulphate and chloride are both of sodium.

5. A process as claimed in claim 1 in which the voltage of the etching current does not fluctuate more than 25%.

References Cited by the Examiner

UNITED STATES PATENTS

| 2,336,846 | 12/1943 | Clark | 204—141 |
| 2,598,043 | 5/1952 | Eichner | 204—141 |
| 2,755,238 | 7/1956 | Turner | 204—33 |
| 3,085,950 | 4/1963 | Thomas et al. | 204—141 |

FOREIGN PATENTS

| 467,024 | 9/1937 | Great Britain. |

JOHN H. MACK, *Primary Examiner.*

R. MIHALEK, *Assistant Examiner.*